United States Patent [19]
Prins et al.

[11] Patent Number: 5,627,695
[45] Date of Patent: May 6, 1997

[54] SYSTEM AND METHOD FOR GENERATING UNIQUE SECTOR IDENTIFIERS FOR AN IDENTIFICATIONLESS DISK FORMAT

[75] Inventors: Douglas A. Prins, Huntington Beach; Gary S. Dickinson, Yorba Linda; Gary E. Schultz, San Juan Capistrano, all of Calif.

[73] Assignee: QLogic Corporation, Costa Mesa, Calif.

[21] Appl. No.: 372,072

[22] Filed: Jan. 12, 1995

[51] Int. Cl.⁶ .............................. G11B 5/09; G11B 5/596
[52] U.S. Cl. ............................................ 360/51; 360/77.08
[58] Field of Search ................................ 360/48, 51, 69, 360/72.1, 77.08

[56] References Cited

U.S. PATENT DOCUMENTS

| | | |
|---|---|---|
| 4,001,883 | 1/1977 | Strout et al. . |
| 4,805,046 | 2/1989 | Kuroki et al. . |
| 4,809,091 | 2/1989 | Miyazawa et al. . |
| 4,989,190 | 1/1991 | Kuroe et al. . |
| 5,050,013 | 9/1991 | Holsinger ............................ 360/72.1 |
| 5,068,755 | 11/1991 | Hamilton et al. ...................... 360/72.1 |
| 5,257,143 | 10/1993 | Zangenehpour . |
| 5,274,509 | 12/1993 | Buch .................................. 360/77.08 |
| 5,276,564 | 1/1994 | Hessing et al. ........................... 360/51 |
| 5,307,216 | 4/1994 | Cook et al. ............................ 360/72.1 |

FOREIGN PATENT DOCUMENTS 62-125965  5/1987  Japan .
63-146198  6/1988  Japan .

*Primary Examiner*—W. C. Kim
*Assistant Examiner*—Regina Y. Neal
*Attorney, Agent, or Firm*—Fish & Richardson P.C.

[57] ABSTRACT

A method and apparatus for determining the position of a head with respect to a rotating magnetic disk within a disk data storage device using standard signals output from a head/drive assembly (HDA). Servo zone detect pulses are used to determine the position of the read/write head with respect to the servo cells. An index pulse determines the angular position of the head. A servo zone counter is incremented by one in response to a servo zone detect pulse. Accordingly, the servo zone counter maintains a unique value which is corresponds to each data wedge on a surface of the disk. A servo clock has a constant number of cycles between sectors. The servo clock is coupled to the clock input of a sector counter. A sector pulse is generated and the sector counter is reset to zero when the number of cycles counted indicates that the beginning of a sector is under the read/write head. A sector ID counter counts the number of sector pulses. The output of the sector ID counter is equal to the sector ID of the sector which the read/write head is currently over. Thus, the data stored in the memory allows the present invention to determine the sector ID of the sector that the read/write head is over. Since the sector ID can be determined without being stored on the disk, at least some of the information which is normally recorded on the surface of the disk (i.e., the sector ID and associated fields) may be removed from the disk surface leaving additional room to store data.

10 Claims, 7 Drawing Sheets

SYSTEM AND METHOD FOR GENERATING UNIQUE SECTOR IDENTIFIERS FOR AN IDENTIFICATIONLESS DISK FORMAT

BACKGROUND OF THE INVENTION

1. Field of the Invention

This invention relates to magnetic recording of digital information, and more particularly, to a method and apparatus for reading and writing data on a rotating magnetic disk media.

2. Description of Related Art

Data storage devices using rotating disks coated with a layer of iron oxide, or other materials susceptible to the influence of magnetic fields, are well known and have been used for many years. Such magnetic disk data storage devices are currently widely used in computer systems. Typically, data is read from, and written to, disks in concentric rings (referred to as "tracks") on each surface of a disk. Tracks are typically divided by servo cells. The collection of portions of each track on one surface of a disk which lie between two servo cells is referred to as a "data wedge". Accordingly, each such data wedge comprises a pie-shaped area on the surface of the disk. Furthermore, the length of that portion of each track that lies within a data wedge depends upon the radial location of the track (i.e., the distance of the track from the edge of the disk). The portion of a track within each data wedge is further subdivided into sectors of dam.

In order to read and write data onto the surface of a disk, a magnetic read/write head is placed in close proximity to the surface of the disk. The read/write head is aligned with a track and reads the data from the track to determine which particular sector within a track the read/write head is currently over. Each sector on a track is associated with a unique sector ID. Each sector includes an identification header in which the sector ID of the track is stored. By reading the header, a disk controller determines where the read/write head is on the track (i.e., determines the sector ID). Accordingly, the controller can determine when a sector containing data to be read, or the sector to which data is to be written, is under the read/write head. The Controller associates each sector of data on the disk with a physical address and a logical address such that the data can be reliably recovered. The physical address indicates in which sector the data resides. The logical address is assigned and mapped to the physical address at the time the data is written to allow the controller to manage the read/write operation more efficiently.

Efforts to increase the areal density of data that may be written on the surface of a disk have been made in the past and are continuing to be made. Improved techniques for increasing areal recording density have been an important enabling factor in the trend in this field toward smaller yet higher capacity, disk drives. Areal recording density is generally expressed in terms of bits per square inch (or other unit area). Analytically, areal density is the product of the track density (i.e., the number of tracks per inch, or "TPI") on the surface of a disk, and the bit density (i.e., the number of bits per inch, or "BPI") that can be recorded along a particular track.

As demand grows for increased areal density, the amount of disk area dedicated to overhead functions, such as determining the sector ID of a particular sector, becomes a greater burden. FIG. 1 illustrates one typical format used on a disk of a disk data storage device. As shown in FIG. 1, the following fields are typically provided in a header associated with each sector of data.

Servo cell 10—Servo cells are commonly used to position a read/write head over a particular track on the surface of a magnetic disk, in known fashion.

Phase Lock Oscillator Field 12—The phase lock oscillator field allows a phase locked oscillator within the head/drive assembly (HDA) to be synchronized to the bit rate at which data is to be read and written.

Sync Byte Field 14—The sync byte field 14 contains a bit pattern that allows synchronization to the boundaries between bytes of data to be read or written prior to reading or writing the sector ID.

Sector ID Field 16—The sector ID field 16 contains the sector ID of the sector that contains the header.

Circular Redundancy Checking (CRC) Field 18—The CRC field 18 contains a CRC code which allows errors in the information stored in the phase lock oscillator field 12, the byte sync field 14, and the sector ID field 16 to be identified.

PAD Field 20—The pad field provides a gap between the CRC field and a data phase lock oscillator field 22 which follows.

Data Phase Lock Oscillator Field 22—The data phase lock oscillator field contains a pattern that allows the HDA phase lock oscillator to re-lock onto the bit rate before reading data to ensure that the phase lock oscillator has not drifted too far from the required frequency since the last phase lock oscillator field 12 was read.

Data Sync Byte Field 24—The data sync byte field 24 contains a bit pattern that ensures that the HDA is synchronized to the boundaries between bytes of data to be read or written prior to reading the data field 26.

Data Field 26—The data field 26 stores the information that is read and written to the disk storage device during normal operation.

Error Correction Code Field 28—The error correction code field is verified the data read from the data field to allow error correction to be performed.

Data Pad Field 30—The data pad field provides a gap between the end of the ECC field 28 and the beginning of a next phase lock oscillator field 12. The overhead fields 12, 14, 16, 18, 20, 22, 26, and 28 require a substantial amount of area on the disk surface. Furthermore, some disk data storage devices currently use magneto-resistive (MR) heads. MR heads have a read head which is spaced apart from the write head. The read and write heads are typically mounted on a common radial actuator arm (i.e., an arm on which the read and write head are disposed at the proximal end, positions the read and write head over a track of data by pivoting about a fixed point at the distal end of the arm). Because the read and write head become skewed with respect to one another (i.e., a line drawn from the read to the write head is not parallel to the track which the head is over), the read and the write head cannot both be aligned over a track. Therefore, in order to read the header and immediately write data to the track associated with that header, a second header must precede the data section offset from the track containing the data section. Accordingly, a greater area is required for the header. Thus, the area of the disk which is available for storing data is reduced. Therefore, it would be advantageous to provide a method and apparatus for determining the sector ID of a sector of data on the disk without the need to consume disk area.

SUMMARY OF THE INVENTION

The present invention is a method and apparatus for determining the position of a head with respect to a rotating magnetic disk within a disk data storage device using standard signals output from a head/drive assembly (HDA). In accordance with the preferred embodiment of the present invention, servo zone detect pulses (generated in conventional fashion within the HDA at a particular time with respect to the edge of a servo cell) are used to aid in determining the position of the read/write head with respect to the servo cells, and thus with respect to an adjacent data wedge. An index pulse generated in conventional fashion within the HDA whenever the disk is at 0° in its rotation further aids in determining the angular position of the head (i.e., which particular servo cell is associated with the most recently generated servo zone detect pulse).

In accordance with the present invention, each time the head is over a predetermined angular reference position, an index pulse is generated by the HDA in conventional fashion. In accordance with the preferred embodiment of the present invention, when the first index pulse occurs, the count value of the servo zone counter is reset to a known value (preferably 0). The servo zone counter is incremented by a predetermined value (preferably 1) in response to a servo zone detect pulse generated in known fashion by a conventional HDA each time the read/write head passes over a servo cell. When the servo zone counter reaches a terminal value, the servo zone counter is reset to the predetermined value and begins to increment again at each occurrence of the servo zone detect pulse. Accordingly, the servo zone counter maintains a value which corresponds to, and is unique to, each data wedge on a surface of the disk. Each such value is used to access data stored in a memory and associated with a corresponding one of the data wedges. The data preferably includes: (1) the sector ID of the first full sector in a data wedge; (2) the number of sector pulses between servo cells (i.e., the number of sectors on the particular portion of a track within a data wedge); (3) the number of bytes between the byte sync of the last sector in the data wedge and the next servo zone detect pulse; (4) the number of servo clocks which should occur before the beginning of the first sector of data is under the read/write head (i.e., the distance from the servo zone detect pulse to the beginning of the first sector); and (5) two bytes of circular redundancy checking (CRC) codes which ensure the validity of the information read from the memory.

A servo clock is provided by a conventional HDA. The servo clock allows the HDA to maintain the rotational velocity of the disk constant. The frequency of the servo clock is essentially arbitrary with respect to the spacing of data on the disk. However, the number of cycles of the servo clock that occur between sectors is constant. In accordance with the preferred embodiment of the present invention, the servo clock is coupled to the clock input of a sector counter. Since the number of servo clock cycles that should occur before the beginning of the first sector is stored in the memory, the sector counter is used to determine when the beginning of the first sector is under the read/write head. The sector counter counts the number of servo clock cycles that have occurred since the first servo zone detect pulse. When a predetermined number of servo clock cycles have occurred (i.e., the number expected to occur before the first sector), a sector pulse is generated and the sector counter is reset to zero. The sector counter again counts the number of servo pulses and generates a sector pulse when a second predetermined number of servo pulses have occurred (i.e., the number expected to occur between the beginning of one sector and the beginning of the next sector). The sector counter is then reset again and again counts the number of servo clock cycles and outputs a sector pulse. This is repeated until the last sector on the data wedge is encountered. Accordingly, a sector pulse is generated each time the read/write head is over the beginning of a sector. Alternatively, other clock signals generated by an HDA assembly, such as a read reference clock which is typically generated by the HDA of a conventional data storage device, can be used in place of the servo clock.

A sector ID counter counts the number of sector pulses generated since the last servo zone detect pulse. The sector ID counter is loaded with the sector ID of the first sector on the data wedge, as stored in the memory. The sector ID counter is incremented by a predetermined value (preferably 1) at each occurrence of a sector pulse from the sector counter. Accordingly, the output of the sector ID counter is equal to the sector ID of the sector which the read/write head is currently over. Thus, the data stored in the memory allows the present invention to determine the sector ID of the sector that the read/write head is over. Since the sector ID can be determined without being stored on the disk, at least some of the information which is normally recorded on the surface of the disk (i.e., the sector ID and associated fields) may be removed from the disk surface leaving additional room to store data. Furthermore, the present invention allows a write operation to be performed without the need for an associated read operation on the same track. This is a distinct advantage when a magneto-resistive (MR) head is used, since the read and write portions of MR heads are typically not simultaneously aligned with a track.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1:
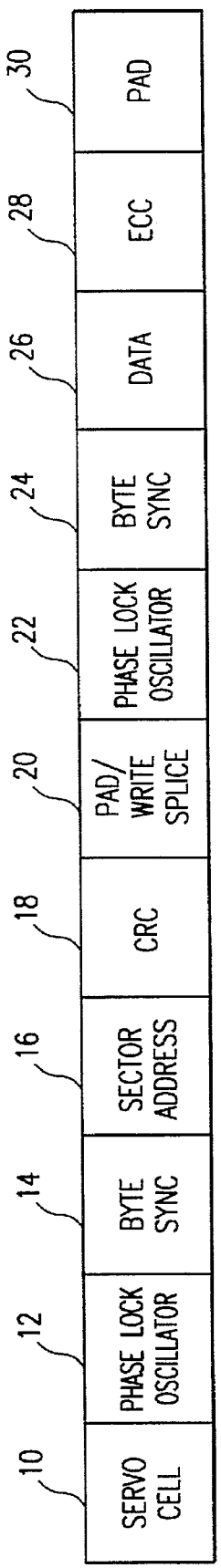
FIG. 1 is an illustration of a typical sector format in accordance with the prior art.
Figure 2:
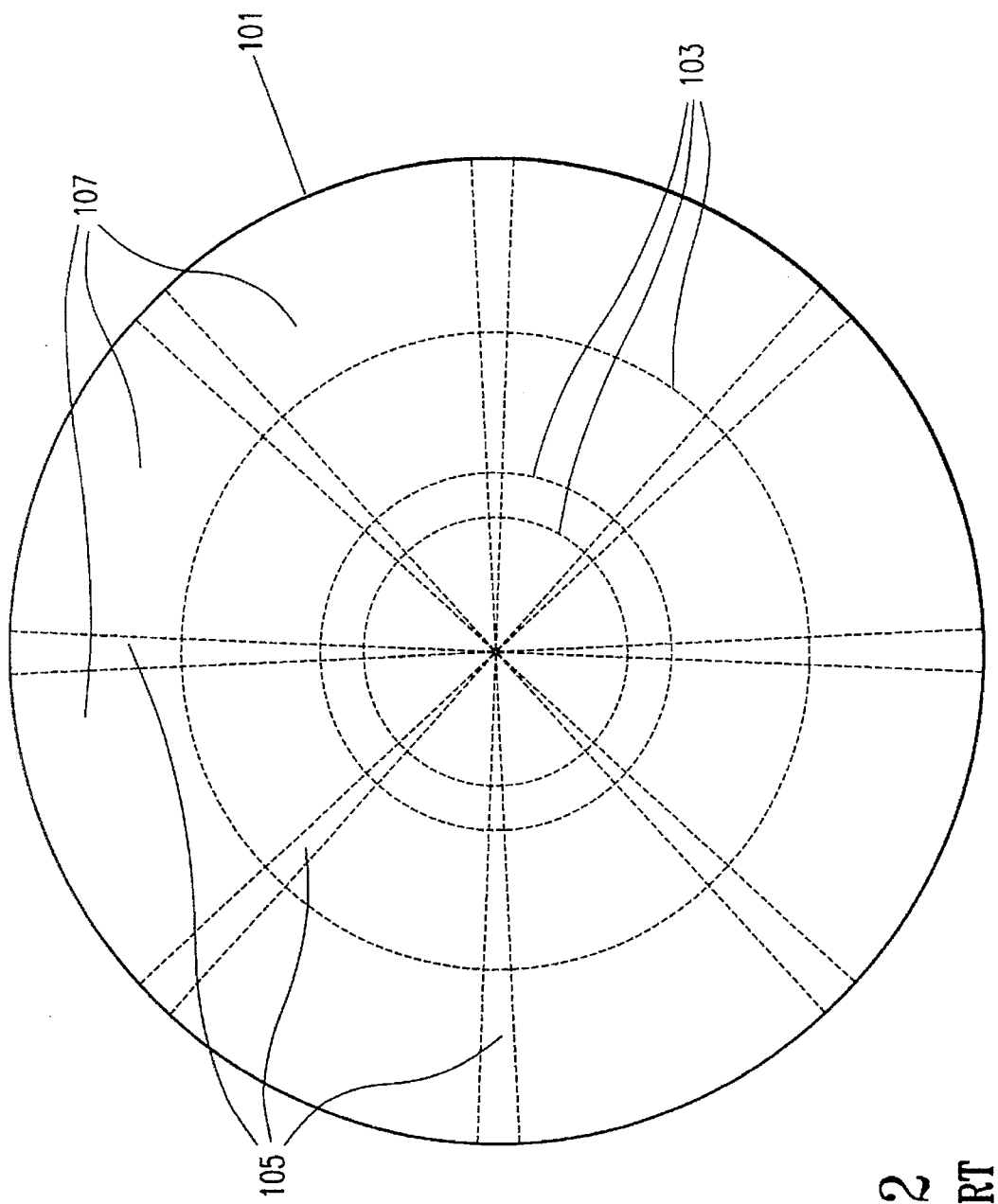
FIG. 2 is an illustration of a surface of a magnetic disk within a disk data storage device.

FIG. 2 is an illustration of a surface 101 of a magnetic disk within a disk data storage device. The surface 101 has a plurality of tracks 103 capable of storing data. Each track 103 is divided by a plurality of servo cells 105. The servo cells 105 of the present invention are preferably conventional servo cells commonly used to position a read/write head over a particular track 103 on the surface 101 of a magnetic disk. Servo cells 105 are typically recorded on the disk during production of the disk. The portions of each track 103 that lie between any two servo cells 105 are collectively referred to as a "data wedge" 107. In accordance with the preferred embodiment of the present invention, a conventional head drive assembly (HDA) generates servo zone detect pulses in conventional fashion each time the read/write head passes over a servo cell 105. In addition, a conventional HDA preferably generates an index pulse when a particular one of the servo cells 105 passes under the read/write head. The present invention takes advantage of these conventional signals to determine the sector ID of sectors trader the read/write head.

Figure 3:
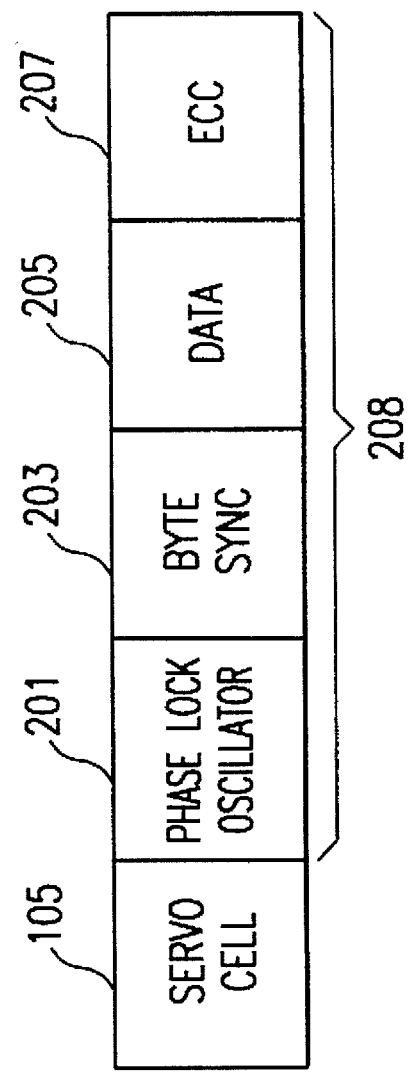
FIG. 3 is an illustration of the information recorded on a portion of one track on the surface of a disk in accordance with the preferred embodiment of the present invention.

FIG. 3 is an illustration of the information that is recorded on a portion of one track 103 on the surface of a disk for the purpose of organizing data to be read from and written to a disk data storage device in accordance with the preferred embodiment of the present invention. Typically, the contents of each of the fields illustrated in FIG. 3 are recorded during a formatting procedure. The information that is written to the disk during formatting must be present for data to be read from the disk during normal operation.

As shown in FIG. 3, a servo cell 105 is followed by a phase lock oscillator (PLO) field 201. The phase lock oscillator field 201 is conventional and allows the HDA to be synchronized to the rate at which bits of data are to be read from, or written to, the disk. Next, a byte synchronization field ("byte sync field") 203 is provided which allows the HDA to be synchronized to the boundaries between bytes of data to be read from, or written to, the disk. A data field 205 follows the byte sync field 203. Data is read from and written to the data field 205 during normal read/write operations. After the data field 205, an error correction code (ECC) field 207 is provided. An ECC is stored in the ECC field 207 which allows errors in the data field to be detected and corrected. The combination of a phase lock oscillator field 201, a byte sync field 203, a data field 205, and ECC field 207 comprise a sector 208 in accordance with the present invention. The ECC field 207 of each sector is followed by another sector 208. The last sector may be split across two data wedges 107 in accordance with the present invention.

Accordingly, it can be seen that the present invention eliminates a substantial number of fields from the header associated with each sector on a disk. That is, the present invention eliminates the need for a phase lock oscillator field 10, byte sync field 12, sector ID field 14, CRC field 16, and pad field 18, all of which are required in the prior art in order to determine the sector ID of a particular sector prior to reading or writing data to the data field. In addition, since the sector ID of a sector is not read from a header at the beginning of the sector, neither micro-positioning during normal write operations nor offsetting of a duplicate header are required in a disk using magneto-resistive heads.

Figure 4:
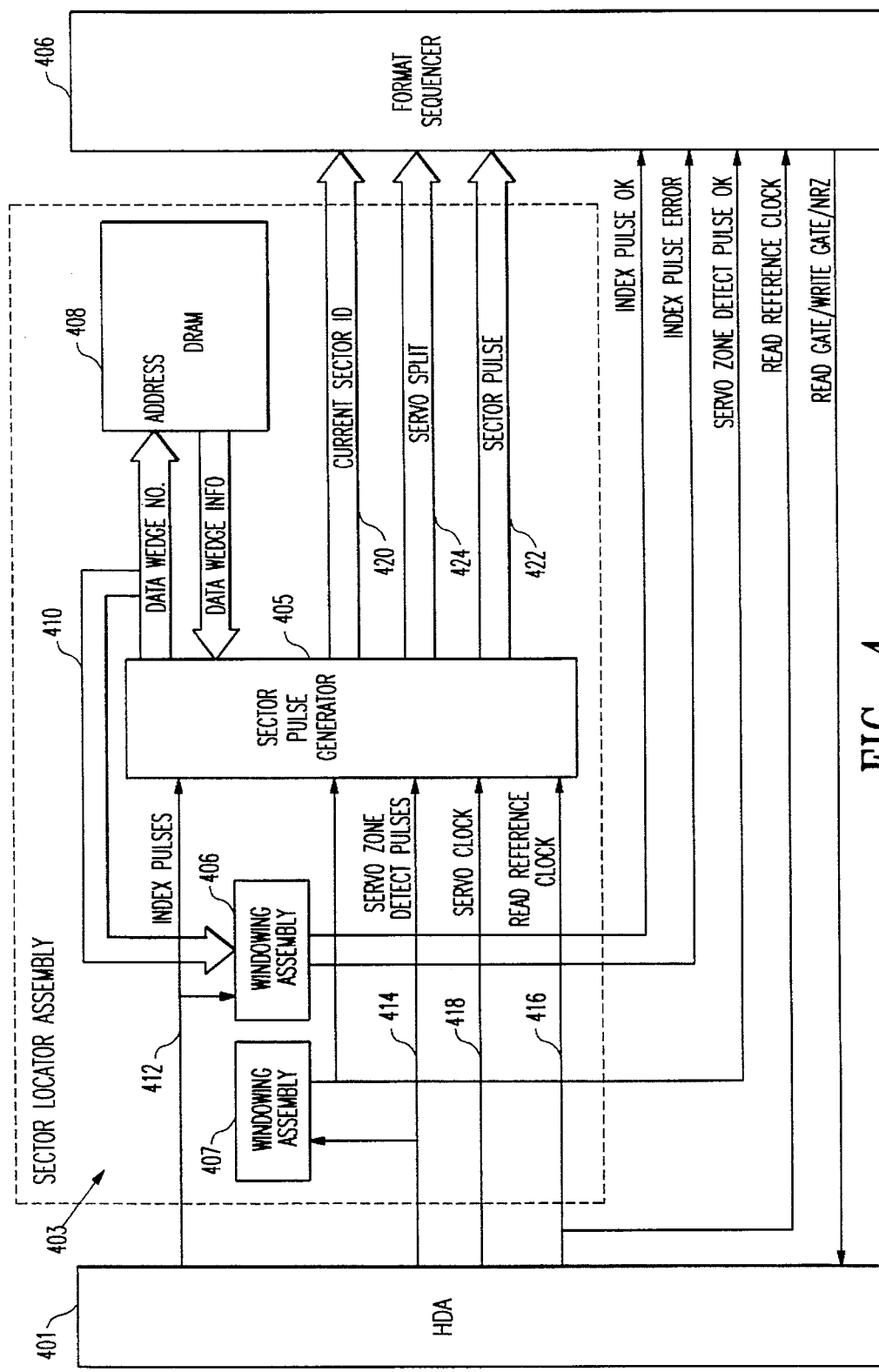
FIG. 4 is a block diagram of the hardware used to implement the preferred embodiment of the present invention.

FIG. 4 is a block diagram of the hardware used to implement the preferred embodiment of the present invention. A sector locator assembly 403 preferably includes a sector pulse generator 405, a servo zone detect pulse windowing assembly 406, an index pulse windowing assembly 407, a dynamic random access memory (DRAM) 408, and a format sequencer 409. In an alternative embodiment of the present invention, the windowing assemblies 406, 407 are not required. As shown in FIG. 4, the HDA 401 provides four signals to the sector locator assembly 403 of the present invention. These signals include: (1) servo zone detect pulse, provided on signal line 414; (2) index pulse, provided on signal line 412; (3) read reference clock, provided on signal line 416; and (4) servo clock, provided on signal line 418. The servo zone detect pulse indicates when the read/write head is over a servo cell 105. The index pulse indicates when the read/write head is over a "reference" servo cell 105. Accordingly, by resetting a counter when the head is over a predetermined position on the disk, and counting the servo zone detect pulses thereafter, the present invention can determine which data wedge the read/write head is over with respect to the reference servo cell 105 that generates the index pulse.

The read reference clock pulses once per byte of data stored on the disk. The servo clock runs at an arbitrary frequency which is relatively high with respect to the servo zone detect pulse frequency. The servo clock is conventionally used by the HDA 401 to maintain the disk at a relatively constant angular velocity. However, in accordance with the present invention, by knowing (1) the number of servo clock pulses that are expected to occur between the time the servo zone detect pulse is received and the time the first sector within a data wedge is under the read/write head, (2) knowing the sector number of the first sector within the data wedge, and (3) the number of servo clock cycles that are expected to occur between sectors of a data wedge 107, the present invention determines the sector number of the sector which the read/write head is over.

In the preferred embodiment, the index pulse windowing assembly 407 provides a "windowing" feature that preferably may be programmably enabled or disabled. The windowing feature ensures that each index pulse is received within a "window" in time (i.e., at least a first predetermined amount of time after the receipt of the last index pulse which causes the window to open, but not more than second predetermined amount of time thereafter, which causes the window to close). The windowing feature verifies that the index pulse has not been falsely identified by the HDA 401. In addition, the servo zone detect pulse windowing assembly 406 ensures that each servo zone detect pulse occurs a first predetermined time after the last servo zone detect pulse and not more than a second predetermined time thereafter. The windowing assemblies 406, 407 are discussed in detail further below.

Figure 5:
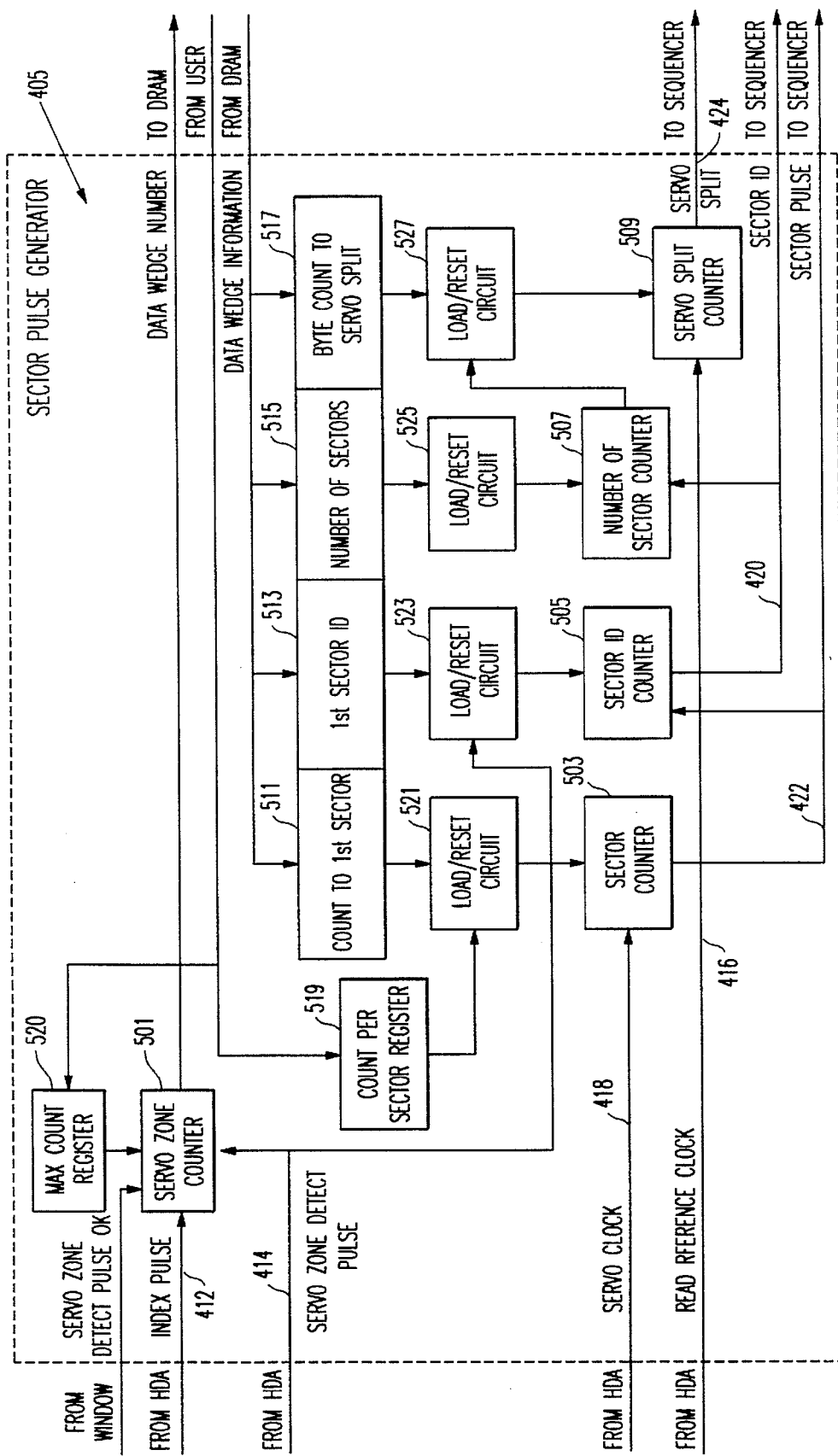
FIG. 5 is a more detailed block diagram of the sector pulse generator in accordance with one embodiment of the present invention.

Sector Pulse Generator FIG. 5 is a more detailed block diagram of the sector pulse generator 405 in accordance with one embodiment of the present invention. The sector pulse generator 405 preferably includes five counters, six registers, and four Load/Reset circuits. The counters include a Servo Zone Counter 501, a Sector Counter 503, a Sector ID counter 505, a Number of Sectors Counter 507, and a Servo Split Counter 509. The registers include a Count Register 511, a Sector ID Register 513, a Number of Sectors Register 515, a Servo Split Register 517, and a Count Per Sector Register 519, and a Maximum Count Register 520. The Load/Reset circuits include a Sector Counter Load/Reset circuit 521, a Sector ID Counter Load/Reset circuit 523, a Number of Sectors Counter Load/Reset circuit 525, and a Servo Split Counter Load/Reset circuit 527.

In the preferred embodiment of the present invention, if the index pulse falls within the index pulse window, or if an index pulse is either the first or second index pulse after initialization, the Servo Zone Counter 501 receives an Index Pulse OK signal over a signal line 412 from the index pulse windowing assembly 407. Accordingly, the present invention verifies that the index pulse has not been falsely generated or detected by the HDA.

Preferably, upon initial application of power, the first index pulse received by the Sector Locator Assembly 403 resets the Servo Zone Counter 501 to an initial value (preferably zero). Thereafter, the Servo Zone Counter 501 preferably resets to that initial value after reaching a terminal count equal to the number of data wedges expected to be received between index pulses plus the initial value. In the preferred embodiment of the present invention, the terminal count value is determined by a value stored in the Maximum Count Register 520. In this way, the present invention ensures that the Servo Zone Counter 501 is reset properly when the read/write head is over the same point on the disk.

If the servo zone detect pulse falls within the servo zone detect pulse window, the Servo Zone Counter 501 receives the servo zone detect pulses on a signal line 414. Each received servo zone detect pulse increments the Servo Zone Counter 501 by a predetermined amount (preferably 1). Accordingly, by counting the servo zone detect pulses starting at the index pulse, the Servo Zone Counter 501 outputs a value that is uniquely associated with the particular data wedge 107 that the read/write head is currently over.

The output from the Servo Zone Counter 501 is coupled to the DRAM 408 over signal lines 410. In response to the output from the Servo Zone Counter 501, the DRAM 408 preferably outputs four values associated with the particular data wedge 107 that the read/write head is currently over. Preferably, a first value indicates the number of servo clock pulses that occur before the read/write head is over the first sector. This "Count" value is stored in the Count Register 511 of the sector locator assembly 403. A second value indicates the sector number of the first sector in the data wedge 107. This "Sector ID" value is stored in the Sector ID Register 513 in the sector locator assembly 403. A third value indicates the number of sectors in the data wedge 107. This "Sectors" value is stored in the Sectors Register 515 of the sector locator assembly 403. A fourth value indicates how many cycles of the read reference clock cycles are to occur from the first sync value 203 of the last sector of the data wedge until the next servo cell 105 is encountered. This "Servo Split" value is stored in the Servo Split Register 517 in the sector locator assembly 403.

Initially, the Count value stored in the Count Register 511 is loaded by a Load/Reset circuit 521 into the Sector Counter 503. The Count value is preferably equal to the number of read reference clock cycles that will occur before the read/write head will be over the first sector of the data wedge. The Count value allows the Sector Counter 503 to determine when the read/write head will be over the first sector of the data wedge. After loading the Sector Counter 503 with the Count value, the Sector Counter 503 is decremented at each servo clock cycle received from the HDA 401. Accordingly, when the Sector Counter 503 reaches zero, a sector pulse is output on a signal line 422. The sector pulse coincides with the read/write head being over the first sector of a data wedge. It will be clear to one of ordinary skill in the art that the Count value can be offset from zero by any value as long as the offset is applied to both the Count value stored in the Count Register 511 and the particular count output from the 1st Sector Counter that causes a sector pulses to be generated when the first sector is under the read/write head.

Accordingly, the first sector within a portion of a track of a data wedge 107 may be spaced apart from the servo cell 105 by any distance. This is very useful when sectors are split between data wedges 107. That is, in one embodiment of the present invention, a sector may be split between two adjacent data wedges 107. The first portion of the sector will be stored on the end of a first data wedge 107, and the second portion of the sector will be stored on the beginning of a second data wedge 107. Thus, the first sector of the second data wedge 107 will be spaced a distance from the servo cell 105 that depends upon how much of the split sector is on each data wedge 107.

Preferably, when the Sector Counter 503 reaches zero, the load/reset circuit 521 loads the contents of the Count Per Sector Register 519 into the Sector Counter 503. The contents of the Count Per Sector Register 519 is preferably equal to the number of servo clock cycles that will occur between the beginning of the first and the second sectors. The Sector Counter 503 continues to be decremented at each servo clock pulse. Accordingly, the read/write head will be over the second sector when the Sector Counter 503 reaches zero for the second time. In accordance with the preferred embodiment of the present invention, the number of servo clock cycles between any two adjacent sectors of a data wedge will be exactly the same. Therefore, by outputting a sector pulse and reloading the Sector Counter 503 with the value of the Count Per Sector Register 519 each time the Sector Counter 503 reaches zero, the present invention generates a reliable sector pulse each time the read/write head is over the beginning of a sector. As is the case with the Count value, the value of the Count Per Sector Register 519 may have an offset, as long as the same offset is applied to the output of the Sector Counter 503 which causes a sector pulse to be generated. The Load/Reset circuit 521 determines which of two sources (i.e., the Count Per Sector Register 519 or the Count Register 511) are loaded to determine when to output a sector pulse.

The Load/Reset circuit 523 initializes the Sector ID Counter 505 with the value of the first sector ID upon receipt of a servo zone detect pulse. Thereafter, the Sector ID Counter 505 is incremented each time the Sector Counter 503 outputs a sector pulse on signal line 422. Thus, the output of the Sector ID Counter 505 is preferably equal to the ID number of each sector prior to the sector pulse which indicates that the read/write head is over that sector.

In addition, the Load/Reset circuit 525 loads the Number of Sectors Counter 507 with the value stored in the Sectors Register 515. Since the Sectors Register 515 maintains a value that is equal to the number of sectors in the data wedge 107 that the read/write head is currently over, by decrementing the Number of Sectors Counter 507 each time a sector pulse is generated, the Number of Sectors Counter 507 will equal zero when the read/write head is over the last sector in a data wedge 107. The output from the Number of Sectors Counter 507 is coupled to the Load/Reset circuit 527. When the Number of Sectors Counter 507 reaches zero, the Load/Reset circuit 527 loads the value from the Servo Split Register 517 into the Servo Split Counter 509. The Servo Split Counter 509 is decremented at the read reference clock rate. Accordingly, when the last sector is split between two data wedges 107, the Servo Split Counter 509 reaches zero at the end of that portion of the last sector that is on the current data wedge 107.

Accordingly, the present invention provides each of the following signals to the format sequencer 409: (1) a sector pulse on a signal line 422 from the Sector Counter 503, (2) a Sector ID from the Sector ID Counter 505 on a signal line 420, and (3) a servo split signal from the Servo Split Counter 509 on a signal line 424. These signals make it possible to find a particular data sector on the disk without the need to read a sector ID from a header writing on the disk. Thus, the areal density of the disk can be improved by reducing the mount of space on the surface of the disk that is consumed by overhead information.

Windowing Assembly

Figure 6A:
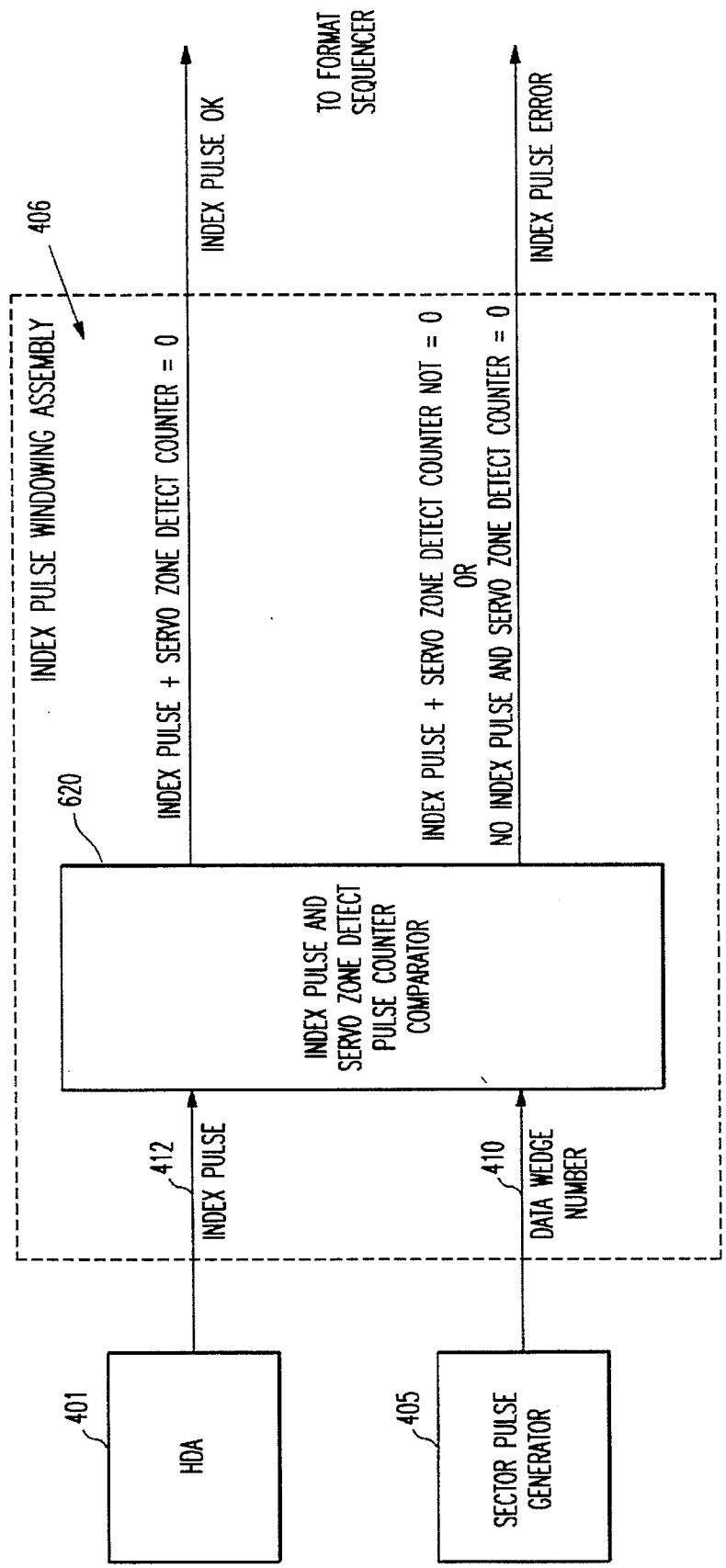
FIG. 6a is a more detailed block diagram of the servo zone detect pulse windowing assembly in accordance with the present invention.

FIG. 6a is a more detailed block diagram of the index pulse windowing assembly 406. An index pulse window comparator 620 determines whether the data wedge number output on signal lines 410 is equal to zero when each index pulse occurs. If the data wedge number is equal to zero when the index pulse occurs, then an "Index Pulse OK" signal is output by the index pulse comparator 620. If (1) the index pulse occurs when the data wedge number is not equal to zero, or (2) does not occur during the entire time the data wedge number is equal to zero, then an "Index Pulse Error" signal is output by the index pulse comparator 620. The Index Pulse OK is preferably coupled to both the format sequencer 409.

Figure 6B:
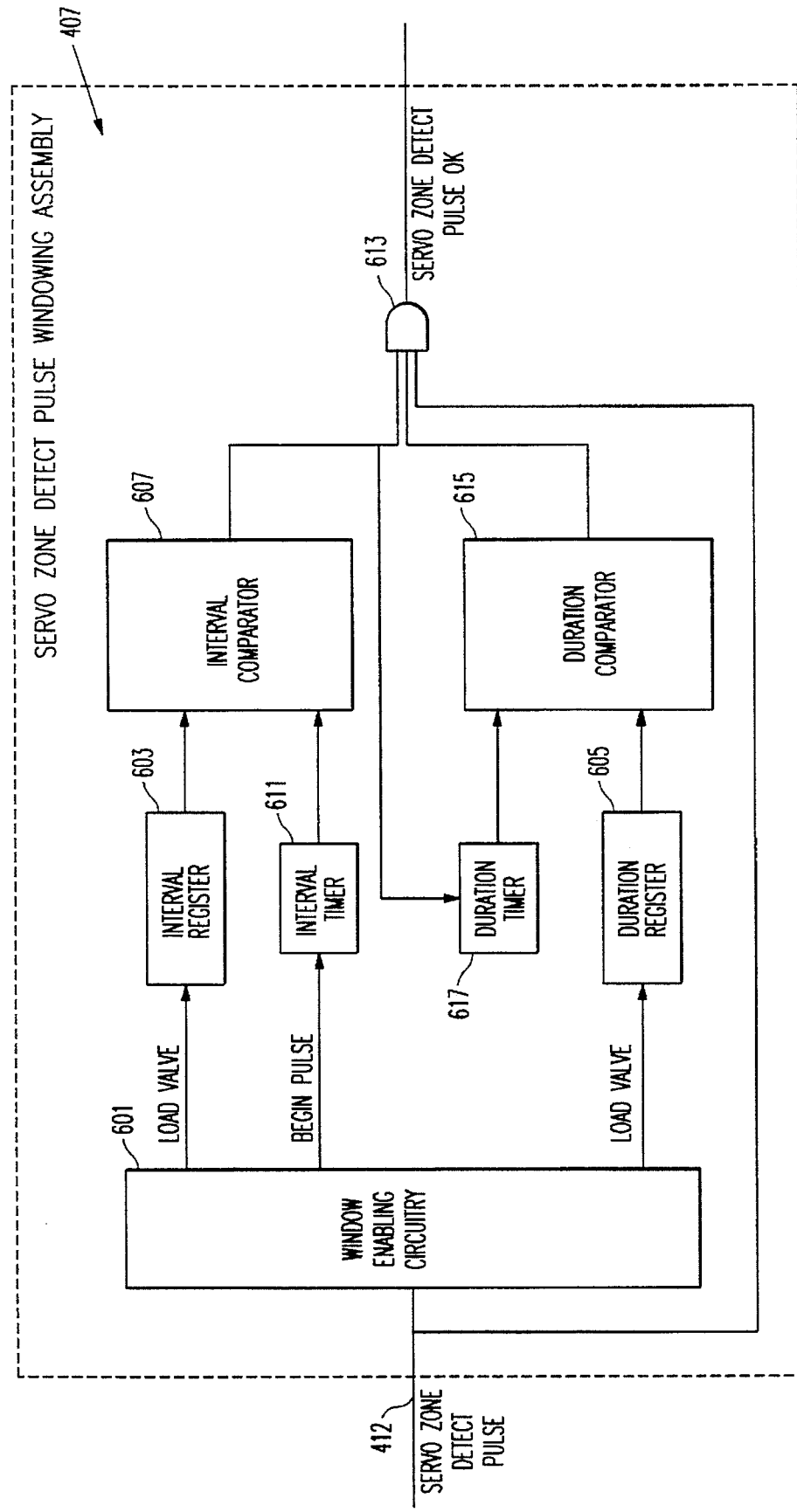
FIG. 6b is a more detailed block diagram of the index pulse windowing assembly in accordance with the present invention.

FIG. 6b is a more detailed block diagram of the servo zone detect pulse windowing assembly 407 in accordance with the present invention. A window control circuit 601 loads an interval register 603 and a duration register 605 with interval and duration values, respectively. The interval value determines the minimum interval in time between valid servo zone detect pulses. That is, the interval value determines when the servo zone detect window will be opened. The duration value determines the maximum amount of time between the end of the interval period and the occurrence of a next valid servo zone detect pulse. Thus, the duration value determines the duration that the window will be open. An interval comparator 607 compares the interval value stored in the interval register 603 to the output from an interval timer 611. The interval timer 611 begins running upon receipt of a begin pulse from the window control circuit 601. The output from the interval comparator 607 is in a positive logic state whenever the value of the interval timer 611 is greater than the interval value stored in the interval register 603. Accordingly, the output of the interval comparator 607 indicates the opening of the window. The output from the interval comparator 607 is coupled to a first input to a window logic circuit 613. Likewise, a duration comparator 615 compares the duration value stored in the duration register 605 with the output of a duration timer 617. The duration timer 617 begins running when the output from the interval comparator 607 is in a positive logic state. The output from the duration comparator 615 is in a positive logic state whenever the duration timer 617 is greater than the value stored in the duration register 605. Thus, the output of the duration comparator 615 indicates the closing of the window. The output from the duration comparator 615 is coupled to a second input of the window logic circuit 613. The servo zone detect pulse is coupled to a third input to the window logic circuit 313. The window logic circuit 313 output is in a positive logic state whenever: (1) the output of interval comparator 607 is in a positive logic state (indicating that the interval between the last two servo zone detect pulses was greater than the minimum interval, as defined by the interval value); (2) the output of the duration comparator 615 is in a negative logic state (indicating that the duration of the window has not been exceeded); and (3) the servo zone detect pulse is present at the input to the window logic circuit 613. That is, if the servo zone detect pulse occurs while the window is open, the output from the window logic circuit 613 will be a positive logic state. The output from the servo zone detect pulse windowing assembly 407 is coupled to the servo zone counter 501 to enable the servo zone counter 501 to increment in response to the receipt of valid servo zone detect pulses.

A number of embodiments of the present invention have been described. Nevertheless, it will be understood that various modifications may be made without departing from the spirit and scope of the invention. For example, in systems in which sectors are never split between two data wedges, there is no need to provide the Number of Sectors Counter, Number of Sectors Counter Load/Reset circuit, Servo Split Counter, Servo Split Load/Reset circuit, Number of Sectors Register, and Servo Split Register. Furthermore, any means for counting the servo zone detect pulses with respect to an index pulse will provide the information needed to uniquely identify each data wedge as the read/write head passes over that data wedge. Any means for determining the number of servo clock cycles, or read reference clock cycles, that occur from the time the servo zone detect pulse is transmitted from the HDA and counting the number of such servo clock cycles, or read reference clock cycles, can be used to determine when the read/write head is over the first sector of the data wedge. Once it can be determined that the read/write head is over the first sector, any means for reading a stored value equal to the sector ID of the first sector of a particular data wedge can be used to identify the sector ID of that first sector. Once the first sector is identified, the identity of each subsequent sector can be stored in a lookup table or can be calculated as describe above by incrementing the value of the first sector ID at the beginning of each sector.

Accordingly, it is to be understood that the invention is not to be limited by the specific illustrated embodiment, but only by the scope of the appended claims.

We claim:

1. A method for outputting a unique sector identification associated with each sector on a rotating data storage medium having a plurality of servo zones within a data storage device, wherein (1) at least one sector for storing data is positioned between adjacent servo zones to define a data wedge, (2) a non-integer number of sectors are selectably be positioned within a data wedge, and (3) the servo zones and sectors lack an embedded sector identifier, the method comprising the steps of:

(a) initializing a servo zone count value in response to receipt of an index servo zone detect pulse generated when a read/write head is proximate an index servo zone, such that each servo zone count value defines a unique value corresponding to one of such servo zones;

(b) changing the servo zone count value in response to receipt of each next servo zone detect pulse generated when the read/write head is proximate each next servo zone;

(c) for each servo zone count value, retrieving predetermined values for:

(1) a first length value defining a distance from a current servo zone to a fixed position within a first sector within a current data wedge;

(2) at least one next length value defining a distance from a fixed position within a current sector within a current data wedge to a fixed position within a next sector within such current data wedge;

(3) a sector identification value defining a unique identifier for such first sector:

(d) changing a sector count value in response to a received servo clock;

(e) outputting a sector pulse when the changes in the sector count value equal the retrieved first length value, such sector pulse thereby indicating a fixed position within such first sector after such current servo zone;

(f) outputting a next sector pulse when the changes in the sector count value equal each retrieved next length value, each such next sector pulse thereby indicating a fixed position within a next sector within such current data wedge;

(g) repeating step (f) until a next servo zone detect pulse is received;

(h) initializing a sector identification count value to the retrieved sector identification value;

(i) changing the sector identification count value in response to each sector pulse output within a current data wedge, whereby each sector within such data wedge is uniquely identifiable by a corresponding sector identification count value.

2. The method of claim 1, wherein the first sector of a current data wedge may be spaced any desired distance from a current servo zone.

3. The method of claim 1, including the further steps of:

(a) for each servo zone count value, retrieving predetermined values for:

(1) a sector tally value defining the number of sectors in a current data wedge;

(2) a servo split value defining the number of servo clocks occurring from a fixed location within the last sector in such current data wedge to a fixed position within the next servo zone;

(b) changing a sector tally count value in response to each sector pulse output within a current data wedge, (c) changing a servo split count in response to the servo clock, commencing when the changes in the sector tally count value equal the retrieved sector tally value;

(d) indicating the end of the last sector in the current data wedge when the changes in the servo split count equal the retrieved servo split value.

4. The method of claim 1, further including the step of applying a servo zone windowing assembly to determine whether each received servo zone detect pulse is valid.

5. The method of claim 1, further including the step of applying an index servo zone detect pulse windowing assembly to determine whether each received index servo zone detect pulse is valid.

6. A system for defining a unique sector identification associated with each sector on a rotating data storage medium having a plurality of servo zones within a data storage device, wherein (1) at least one sector for storing data is positioned between adjacent servo zones to define a data wedge, (2) a non-integer number of sectors are selectively be positioned within a data wedge, and (3) the servo zones and sectors lack an embedded sector identifier, the system including:

(a) a servo zone counter having a servo zone count value initialized in response to receipt of an index servo zone detect pulse generated when a read/write head is proximate an index servo zone, such that each servo zone count value defines a unique value corresponding to one of such servo zones, the servo zone count value being changed in response to receipt of each next servo zone detect pulse generated when the read/write head is proximate each next servo zone;

(b) storage means, coupled to the servo zone counter, for storing, for each servo zone count value, predetermined values for:

(1) a first length value defining a distance from a current servo zone to a fixed position within a first sector within a current data wedge;

(2) at least one next length value defining a distance from a fixed position within a current sector within a current data wedge to a fixed position within a next sector within such current data wedge;

(3) a sector identification value defining a unique identifier for such first sector;

(c) a sector counter, coupled to the storage means, having a sector count value that is changed in response to a received servo clock, and which outputs a sector pulse when the changes in the sector count value equal (1) the first length value for a current servo zone count value, such sector pulse thereby indicating a fixed position within such first sector after such current servo zone, and (2) each next length value for a current servo zone count value, each such next sector pulse thereby indicating a fixed position within a next sector within such current data wedge;

(d) a sector identification counter, coupled to the storage means and the sector counter, having a sector identification count value initialized to the sector identification value for a current servo zone count value, such sector identification count value being changed in response to each sector pulse output within a current data wedge, whereby each sector within such data wedge is uniquely identifiable by a corresponding sector identification count value.

7. The system of claim 6, wherein the first sector of a current data wedge may be spaced any desired distance from a current servo zone.

8. The system of claim 6, further including:

(a) storage means, coupled to the servo zone counter, for storing, for each servo zone count value, predetermined values for:

(1) a sector tally value defining the number of sectors in a current data wedge;

(2) a servo split value defining the number of servo clocks occurring from a fixed location within the last sector in such current data wedge to a fixed position within the next servo zone;

(b) a sector tally counter, coupled to the storage means, having a sector tally count that is changed in response to each sector pulse output within a current data wedge, (c) a servo split counter, coupled to the storage means and the sector tally counter, having a servo split count that changes in response to a received servo clock, commencing when the changes in the sector tally count value equal the sector tally value, and which indicates the end of the last sector in the current data wedge when the changes in the servo split count equal the servo split value.

9. The system of claim 6, further including a servo zone windowing assembly to determine whether each received servo zone detect pulse is valid.

10. The system of claim 6, further including an index servo zone detect pulse windowing assembly to determine whether each received index servo zone detect pulse is valid.

\* \* \* \* \*